(12) United States Patent
Pedone et al.

(10) Patent No.: US 6,928,580 B2
(45) Date of Patent: Aug. 9, 2005

(54) DISTRIBUTED DATA CENTER SYSTEM PROTOCOL FOR CONTINUITY OF SERVICE IN THE EVENT OF DISASTER FAILURES

(75) Inventors: Fernando Pedone, San Mateo, CA (US); Svend Frolund, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 09/901,972

(22) Filed: Jul. 9, 2001

(65) Prior Publication Data

US 2003/0009707 A1 Jan. 9, 2003

(51) Int. Cl.[7] .............................................. G06F 11/00
(52) U.S. Cl. .......................... 714/7; 714/6; 707/202
(58) Field of Search ...................... 714/4, 6, 7; 707/8, 707/201, 202

(56) References Cited

U.S. PATENT DOCUMENTS

| | | | | |
|---|---|---|---|---|
| 5,812,751 A | * | 9/1998 | Ekrot et al. ..................... | 714/4 |
| 5,951,694 A | * | 9/1999 | Choquier et al. ............. | 714/15 |
| 6,266,784 B1 | * | 7/2001 | Hsiao et al. ..................... | 714/6 |
| 6,421,688 B1 | * | 7/2002 | Song .......................... | 707/203 |
| 6,442,552 B1 | * | 8/2002 | Frolund et al. ............... | 707/10 |
| 6,594,786 B1 | * | 7/2003 | Connelly et al. ............. | 714/50 |
| 6,658,589 B1 | * | 12/2003 | Taylor ........................... | 714/6 |
| 6,714,980 B1 | * | 3/2004 | Markson et al. ............ | 709/226 |
| 2002/0129294 A1 | * | 9/2002 | Pedone et al. ................ | 714/4 |
| 2002/0163910 A1 | * | 11/2002 | Wisner et al. .............. | 370/389 |

OTHER PUBLICATIONS

Hobbs; Oracle Database Administration: Hot Standby for Rdb Systems; 2001; http://www.oracle.com/rdb/product_info/html_documents/hotstdby.html.*
Oracle 8: SQL Reference; Dec. 1997; Release 8.0.*
U.S. Appl. No. 09/804,954, filed Mar. 12, 2001, Pedone et al.

* cited by examiner

*Primary Examiner*—Scott Baderman
*Assistant Examiner*—Joshua Lohn

(57) ABSTRACT

A distributed data center system protocol is provided which includes providing a client having a failure detector, a primary data center, and a backup data center operatively interconnected. A transaction operation is provided from the client to the primary database server in the primary data center and the backup database server for execution. If the client detects a failure or suspects a failure of the primary database server, the transaction operation is provided to the backup database server, which becomes the new primary database server. The database server executing the transaction operation returns the executed transaction operation to the client. If the primary data center suffers a disaster, the backup data center takes over control.

27 Claims, 2 Drawing Sheets

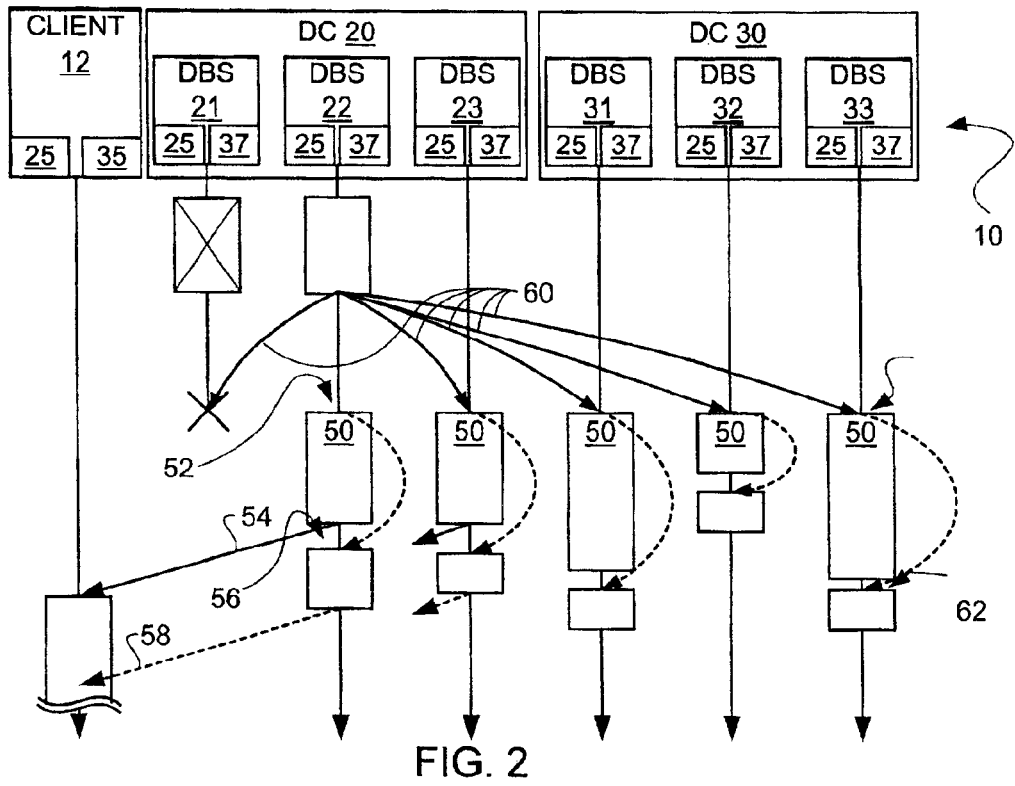
FIG. 2
FIG. 3
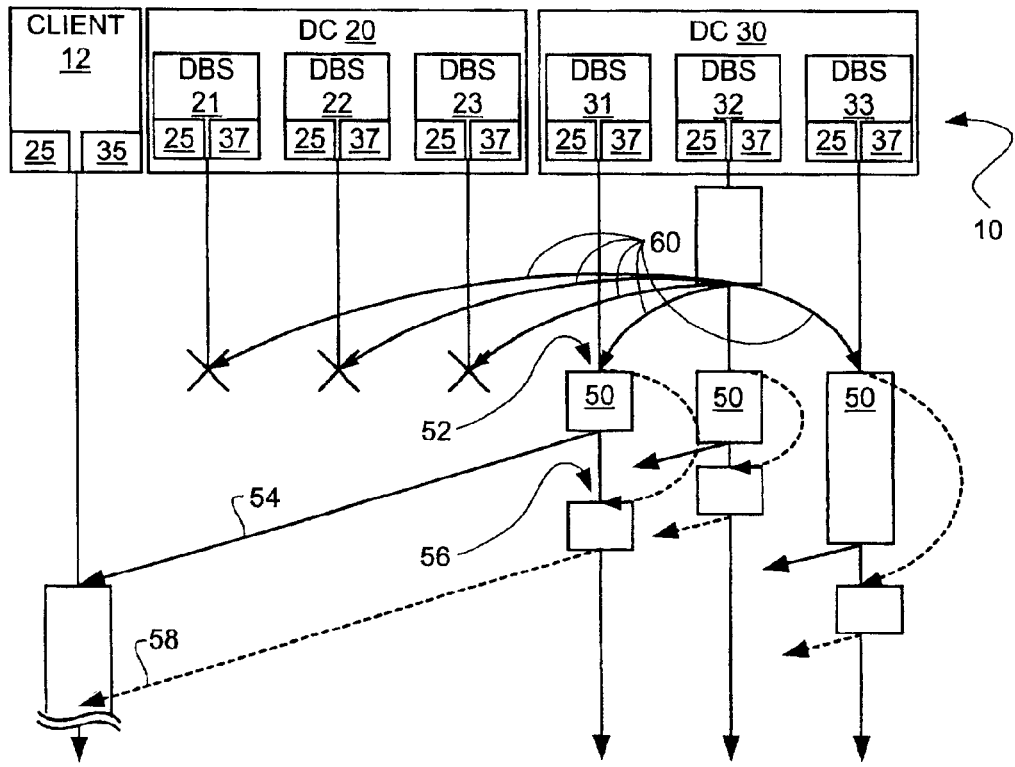

DISTRIBUTED DATA CENTER SYSTEM PROTOCOL FOR CONTINUITY OF SERVICE IN THE EVENT OF DISASTER FAILURES

TECHNICAL FIELD

The present invention relates generally to a distributed data center system protocol, or method, and more specifically to a distributed data center system protocol that prescribes how database clients and data centers interact for continuity of service in the event of disasters.

BACKGROUND ART

For distributed data center computer systems, disasters can be caused by the environment (e.g., floods, earthquakes, fires), and also a coincidence of events within the computer system itself (e.g., operator errors, simultaneous crash of critical components due to software faults). To deal with environment disasters, computer systems typically run in multiple geographically dispersed data centers, which consist of interconnected database servers with independent failure mode. Data centers are connected through possibly redundant wide-area network links, and typically operate in a primary-backup manner; i.e., if the primary data center suffers a disaster, the backup data center takes over. To enable the take over, the data in the backup data center is continuously kept up-to-date.

Existing approaches for providing continuity of service in the event of disaster failures in database client and server systems address either intra-data center replication (i.e., local-area replication) or inter-data center replication (i.e., wide-area replication), but typically not both. Moreover, it is not trivial to combine existing point solutions into a computer system that provides both capabilities.

For example, a local-area replication mechanism may replicate a data item x in two databases DB-1 and DB-2 that both run in the same data center. To combine this mechanism with a wide-area replication scheme, it is necessary to carefully orchestrate the propagation of updates to x to other backup data centers. For performance reasons, both should not propagate the same updates to x to the backup data center. On the other hand, each update should be propagated to x in a fault-tolerant manner such that an update should not be lost if either DB-1 or DB-2 goes down. Existing systems for disaster recovery typically propagate updates at the level of a transaction log. Examples of such systems include Remote Database Facility (RDF) from Compaq Computer Corporation and Symmetrix Remote Data Facility (SRDF) from EMC. These systems do not provide any means to orchestrate the propagation of updates from multiple logs.

The traditional way to provide local-area replication is through a parallel database system, such as Oracle Primary Server (OPS) or Extended Parallel Server (XPS). These systems run in clusters, where each cluster node contains an instance of the database. With a shared-disk approach, used by OPS, the instances access the same disk (each cluster node mounts the disk). With a shared-nothing approach, used by XPS, the instances access their own disk, but can mount each other's disk if an instance fails. In both cases, the disk sharing requires special hardware. Furthermore, each instance in a cluster of a parallel database has its own transaction log, and disaster recovery at the transaction log level is usually used for such systems.

It would be advantageous to use databases from different vendors to decrease the chance of data corruption because the database replicas will be implemented differently. This advantage would be similar to multi-version programming. However, parallel databases are inherently homogeneous systems: it is not currently possible to build a highly available system by combining standard databases from different vendors. This has become increasingly important in order to support e-commerce applications that have to be continuously available, by reducing the impact of data centers disasters and database failures on the overall system downtime.

In the past, it has not been possible to build a system which: (a) ensures continuity of service in the event of data center disasters and database crashes, (b) provides strong and well-defined consistency guarantees, (c) allows commercial, off-the-shelf, databases from different vendors to be used together in the system, and (d) tolerates unreliable failure detector mechanisms within data centers.

A solution to these problems has been long sought but has long eluded those skilled in the art.

DISCLOSURE OF THE INVENTION

The present invention provides a protocol that guarantees continuous database service operation which (a) ensures continuity of service in the event of data center disasters and database crashes, (b) provides strong and well-defined consistency guarantees, (c) allows commercial, off-the-shelf, databases from different vendors to be used together in the system, and (d) tolerates unreliable failure detector mechanisms within data centers.

The present invention further provides the support necessary to build e-commerce applications that have to be continuously available, by reducing the impact of data centers disasters and database failures on the overall system downtime. Data center disasters and database failures are masked and provide continuous transaction processing in a transparent way.

The present invention further provides transaction shipping for both local-area and wide-area replication. The same basic mechanism for both types of replication is used to allow a combined approach. For example, the replication of databases within a data center can be used to make the disaster-recovery protocol fault-tolerant. Residing above the database also allows transaction shipping to cope with heterogeneous systems because the system can rely on a standard interface (e.g. JDBC) only. Finally, using transactions as the unit of replication and shipping gives access to a higher level of semantic information about data updates as compared to a transaction log.

The above and additional advantages of the present invention will become apparent to those skilled in the art from a reading of the following detailed description when taken in conjunction with the accompanying drawings.

BRIEF DESCRIPTION OF THE DRAWINGS

FIG. 2 is the distributed data center system showing the operation of the distributed data center system protocol of the present invention when a backup database server suspects the current primary database server of having failed; and FIG. 3 is the distributed data center system showing the operation of the distributed data center system protocol of the present invention when a backup database server suspects the current primary data center of having failed.

BEST MODE FOR CARRYING OUT THE INVENTION

Figure 1:
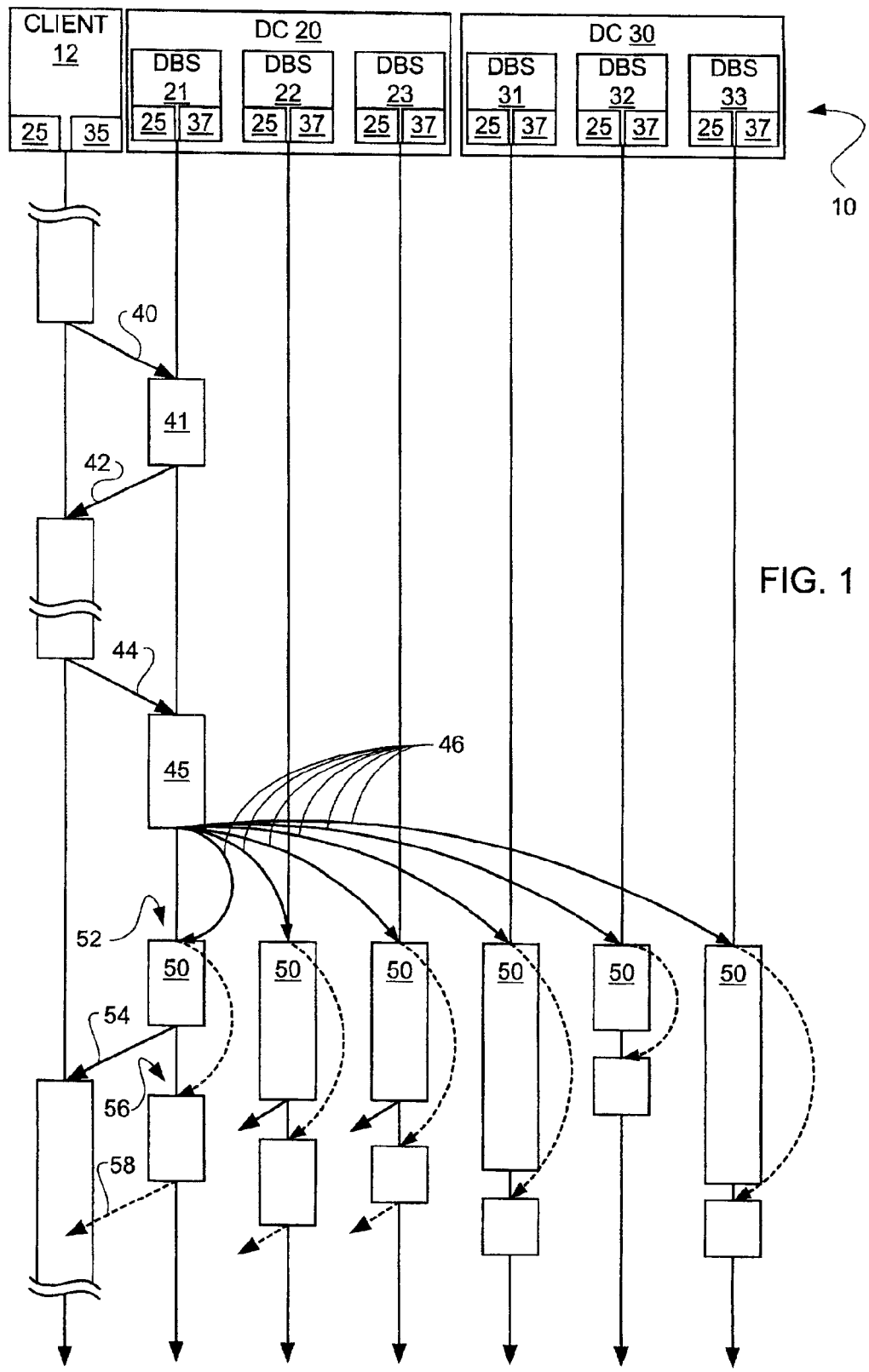
FIG. 1 is a distributed data center system showing the operation of the distributed data center system protocol of the present invention.

The present invention is a distributed data center system protocol that prescribes how database clients and data centers interact to achieve a common goal. The protocol consists of two parts: one is executed at the database clients, and the other at the data centers. The database clients interact with the data centers to execute transactions.

Disasters can be caused by the environment (e.g., floods, earthquakes, fires), and also a coincidence of events within the computer system itself (e.g., operator errors, simultaneous crash of critical components due to software faults). Disaster-resilient systems often rely on some replication mechanism. For example, to implement disaster recovery for a database system, a typical configuration is to have an active database in a primary data center and stand-by databases in the primary data center and in backup data centers. One of the major problems solved by the present invention is how to handle the failover of these data centers transparently, i.e., within the primary data center and across data centers. This means that, if during the execution of a service the primary database fails, clients do not have to wait until the database recovers to have their requests executed.

The present invention meets the following requirements: (a) it assumes a system composed of heterogeneous off-the-shelf standard database systems, provided by different vendors, (b) it does not weaken the consistency guaranteed in a database system composed of a single database in a single data center and ensures that transactions are only committed once, (c) it implements different durability guarantees, allowing clients to specify conditions under which lost transactions are acceptable in order to increase performance, and (d) it does not require perfect failure-detector mechanisms within a data center. These requirements represent state-of-the-art, three-tier architectures of practical interest.

Meeting these requirements is not a trivial task because:
  (a) A system that consists of off-the-shelf databases accepts no solution that involves modifying the database. Databases have to be seen as "black-boxes" accessed only via standard interfaces (i.e., SQL). Furthermore, since the system is heterogeneous, no particular feature provided by a specific vendor can be used (i.e., no particular SQL version).
  (b) Clients should not be able to distinguish, in terms of consistency guarantees, a highly-available system, composed of several data centers and database servers within data centers from a system composed of only one database server. This is an important aspect as it allows clients designed for single database systems to be transparently integrated in a highly-available system. It is also a very hard goal to meet since it requires careful synchronization between database servers.
  (c) Clients can improve the performance of the system by varying durability guarantees and accepting that some transactions get lost in case of disaster failures. The difficulty in implementing different levels of durability is to guarantee that in whatever level, the system is always consistent.
  (d) Failure detection within data centers is performed automatically (i.e., without operator intervention). Thus, mechanisms designed to be used in a data center should cope with failure detectors' mistakes. By contrast, failure detection across data centers is reliable since it cannot be done automatically, and always requires operator intervention. It is difficult to design systems that should cope with unreliable failure detectors. The intuitive reason is that the system must be "flexible" to accept wrong failure suspicions, but "strong" to guarantee that some useful computation is performed.

The present invention solves the database availability problem and satisfies all the requirements described above: clients do not block waiting for database recovery, and are not able to distinguish, in regard to consistency, a system composed of a single database from a system composed of an ensemble of databases, transactions are only committed once, databases from different vendors can participate in the ensemble, as long as they comply with standard interfaces (i.e., SQL), and the solution can cope with failure detectors that make mistakes within data centers.

A distributed data center system can be made up of a plurality of clients (also known as application servers) and a plurality of data centers, where a data center is composed of a plurality of database servers.

Referring now to FIG. 1, therein is shown a simplified distributed data center system 10 in which the distributed data center system protocol of the present invention is used. The data center system 10 has a client 12 and first and second data centers 20 and 30. The first data center (DC) 20 has database servers (DBS) 21–23 and the second data center 30 has database servers 31–33. The client 12 connects to a primary database server in the primary data center (the primary data center is the data center where the primary database server is located), which for purposes of the example is the database server 21 in the data center 20. The database servers 22–23 and 31–33 are backup database servers.

A transactional job abstraction models the business logic that runs in the clients. The client 12 submits transactional job requests and waits for the result of the transactional job requests.

The distributed data center system protocol of the present invention guarantees that even in the event of database server failures and data center disasters, the client 12 will eventually have its transactional job requests executed. A data center suffers a disaster if the database servers that are part of it are not able to perform any useful computation anymore (e.g., a majority of the servers crash); e.g., the database servers 21–23 are unable to perform in data center 20.

The client side of the distributed data center system protocol can execute the business logic corresponding to the transactional job as many times as it wants. Each execution of the job results in requesting transaction operations (i.e., SQL statements) to the database servers. The database server part of the protocol receives the transaction operations from the client, performs some computation, and executes the operations against the local database. The data center system 10 may run in two modes: durability level 1 and durability level 2. Durability level 1 has better response time than durability level 2, but in case of disaster failures, it may lose some transactions.

The client 12 and the database servers 21–23 and 31–33 each have access to two local detector modules: one module monitors database server failures and the other module monitors data center disasters. The client 12 and the database servers 21–23 and 31–33 monitor database server failures using failure detectors 25.

The failure detectors 25 are described by the following properties where p is a client or database server, and q is a database server. It may be said that p suspects q if the server failure detector of p suspects q to have failed or crashed. The suspicion information can be abstracted through the predicate suspect( ). The execution of suspect(q) by p at time t returns true if and only if p suspects q at time t. The failure detectors 25 for clients and database servers have the following properties:

(a) Strong Completeness: if a database server crashes at time t, then there is a time t'>t after which it is permanently suspected by every client and by every database server (other than itself).

(b) Eventual Weak Accuracy: if a data center contains a database server that does not crash, then there is a time after which this database server is never suspected by any client and by any database server.

Disaster detectors are different for clients and database servers. The client 20 uses a disaster detector 35 with the following properties:

(a) Strong Completeness: if a data center suffers a disaster at time t, then there is a time t'>t after which it is permanently suspected by every client.

(b) Eventual Strong Accuracy: there is a time after which no data center that does not suffer a disaster is suspected by any client.

The database servers 21–23 and 31–33 use a disaster detector 37 having the following properties:

(a) Strong Completeness: if a data center suffers a disaster at time t, then there is a time t'>t after which it is permanently suspected by every database server.

(b) Strong Accuracy: no data center that does not suffer a disaster is ever suspected by database servers.

The database servers 21–23 and 31–33 each have access to a local database (not shown) equipped with a two-phase locking (2PL) scheduler. This is necessary to provide information about the order transactions execute. For example, if two transactions $t_1$ and $t_2$ execute concurrently to update common data items in a database, and $t_1$ commits before $t_2$, then $t_2$'s updates will supersede $t_1$'s.

In order to ensure system progress and avoid situations where the database servers guarantee data consistency by never committing transactions, if a database server keeps sending transactions to a database, the database is to eventually commit these transactions. This is often implicit in most database systems. It allows databases to abort transactions in abnormal situations, such as deadlocks, but provides the guarantee that if a database server keeps submitting a transaction, the transaction will eventually be committed.

It is assumed that clients and database servers do not behave maliciously, and are all connected through reliable channels. Link failures are not excluded, as long as any link failure is eventually repaired. In practice, the abstraction of reliable channels is implemented by retransmitting messages and tracking duplicates. Reliable channels are defined by the primitives send and receive.

The database servers 21–23 and 31–33 can also exchange messages using a broadcast abstraction built on top of reliable channels.

The broadcast communication is defined by three primitives broadcast(m), $deliver_1(m)$, and $deliver_2(m)$, and guarantees that:

(a) if a database server in a data center that does not suffer a disaster executes $deliver_1(m)$, then every database server that does not crash in data centers that do not suffer disasters execute $deliver_1(m)$ (1-safe agreement);

(b) if the primary database server executes $deliver_2(m)$, then every database server that does not crash in data centers that do not suffer disasters execute $deliver_2(m)$ (2-safe agreement);

(c) if two database servers, p and q, both execute $deliver_1$ ($m_1$) and $deliver_1(m_2)$, for some messages $m_1$ and $m_2$, then p delivers $m_1$ before $m_2$ if and only if q delivers $m_1$ before $m_2$ (total order); and (d) no database server executes $deliver_2(m)$ before executing $deliver_1(m)$. This broadcast abstraction can be implemented with standard atomic broadcast protocols that run independently of one another in each data center.

The distributed data center system protocol is based on the primary-backup replication model, where one database server such as the database server 21 in a data center such as the data center 20 is assigned the role of primary, and is the only database server that processes transaction requests submitted by the client 12 (resulting from the execution of a transactional job). The other database servers 22–23 and 31–33, the backups, interact only with the primary, the database server 21.

The client 12 must first decide whether to execute at durability level 1 or 2. To execute a transactional job j, the client 12 takes a first transaction request originated from the execution of j (i.e., begin transaction) and sends this request with the durability level to the database server that the client believes to be, most likely, the current primary, e.g., the database server 21. After sending the begin transaction request 40, the client 12 waits for the result, suspects the database server 21 contacted to have crashed, or suspects the data center 20 to have suffered a disaster. The execution proceeds as follows.

(a) If the database server 21 contacted is the current primary, it executes the request 40 and sends the result 42 to the client 12. In this case, the client continues executing j, by submitting other transaction requests to the primary on behalf of j. If the primary database server 21 does not crash and is not suspected by the client 12, the execution proceeds until the client 12 requests the transaction termination 44 (i.e., commit or abort).

(b) If the database server 22–23 contacted is not the current primary, the database server returns an error message to the client 12, which will choose another database server 22–23 in the same data center 20 or in another data center 30 and send the transaction operation to it.

(c) If the client 12 suspects a data center or a database server, it sends an abort request to the database server (just in case it was a false suspicion), chooses another database server 22–23 in the same data center 20 or in another data center 30 and re-executes job j (i.e., by sending the begin transaction request 40)

If the primary, the database server 21, does not crash and is not suspected, the client 12 eventually issues a request to terminate the transaction (i.e., commit or abort).

When the primary database server 21 receives the message to start a new transaction t, it checks whether it has already committed some transaction corresponding to the same job as t. This guarantees that a job only generates one committed transaction per database. If no transaction has been committed for the same job, the primary database server 21 starts the new transaction t. The primary database server 21 processes 41 SQL statements by sending them to the local database and waiting for the reply 42, which is then sent to the client 12. The client 12 then sends a commit request 44 to the database server 21 which executes 45 the commit request 44 by broadcasting 46 a transaction unique identification, SQL statements associated with the transaction, and some control information to the backup data servers 22–23 in its data center 20, and the backup data servers 31–33 in the backup data center 30.

Upon executing $deliver_1(m)$ of a message m containing a committing transaction, each of the database servers 21–23 and 31–33 executes a certification test 50, as will later be described, to decide to commit or abort the transaction. All the database servers 21–23 and 31–33 execute the same certification test 50, and so, they all reach the same outcome decision: commit or abort the transaction.

If a database server decides to commit a transaction, it executes the SQL statement associated with the transaction against the local database, making sure that if two transactions $t_1$ and $t_2$ have to be committed, and $t_1$ is delivered before $t_2$, the $t_1$ SQL statements are executed before the $t_2$ SQL statements.

If transactions are executed with durability level 1, after receiving a confirmation from the database that the transaction has been committed, the primary database server 21 in the primary data center 20 sends a commit reply 54 to the client 12.

If transactions are executing with durability level 2, the primary database server 21 in the primary data center 20 only sends the commit reply 58 to the client 12 after it executes $deliver_2(m)$ 56.

The database server side of the distributed data center system protocol handles disasters, crashes, and suspicions in the following manner. If the primary data center 20 suffers a disaster, or the primary database server 21 crashes or is suspected by some database server 22–23 or 31–33 to have crashed, the execution evolves as a sequence of epochs (the failure detectors 37 used by database servers 21–23 and 31–33 to suspect data center disasters precludes false suspicions). During an epoch, there can only exist one primary data center and one primary server in the primary data center. The primary server is deterministically determined from the epoch number.

Referring now to FIG. 2, therein is shown the operation when a backup data server 22–23 in the primary data center 20 suspects the primary database server 21 to have crashed (case 1).

Referring now to FIG. 3, therein is shown the operation when a backup data server 31–33 in the other data center 30 suspects the primary data center 20 to have suffered a disaster (case 2).

In both FIG. 2 and FIG. 3, the backup data server 22 or 31–33 broadcasts 60 a message to all database servers 21–23 and 31–33 to change the current epoch. This will result in some backup database server taking over the role of primary database server 21. The next primary database server may be a backup database server in the primary data center (in case 1), or a backup database server in a secondary data center (in case 2).

A backup database server may suspect the current primary database server 21 incorrectly. In such a case, the primary database server 21 also delivers the change epoch message, aborts all transactions in execution, and informs the clients (in multi-client systems) corresponding to these transactions that a new database server has become the primary database server. The clients will then re-start the execution of their jobs using the new primary database server, as described before.

The certification test 50 executed by database servers 21–23 and 31–33 after delivering a transaction takes the current epoch and the epoch in which the transaction executed into account. When the primary database broadcasts a transaction t, it also includes the epoch $e_t$ in which t executed. When a database server executes $deliver_1(m)$, where m contains t's requests together with $e_t$, it checks whether the current epoch e is the same as $e_t$. If it is, the database server commits t; otherwise the database server aborts t.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A distributed data center system protocol comprising:

providing a client having a failure detector and a plurality of data centers each including a plurality of database servers;

selecting one of the plurality of data centers to be a primary data center with the other of the plurality of data centers to be a backup data center;

selecting one of the plurality of database servers in the primary data center to be a primary database server with the other of the plurality of database servers therein to be a backup database server and the plurality of database servers in the backup data center to be backup database servers;

providing communications from the client to the primary database server and the backup database servers;

selecting one of the backup database servers as a new primary database server when one of the backup database servers detects a failure of the primary database server; and when the primary database server receives a message from the client to start a new transaction, checking whether the primary database server has already executed another transaction corresponding to the new transaction to ensure that a job generates one committed transaction per database.

2. The distributed data center system protocol as claimed in claim 1 wherein:

providing the plurality of database servers includes providing local databases therefor; and providing the communications includes the primary database server sending a transaction operation to the local database and executing the transaction operation.

3. The distributed data center system protocol as claimed in claim 1 including:

providing a transaction operation from the client to the primary database server and the backup database servers; and executing the transaction operation and a second transaction operation in the same order both in the primary database server and the backup database server.

4. The distributed data center system protocol as claimed in claim 1 including:

providing first and second durability levels of operation wherein employing the first durability level in the primary database server executes the transaction operation faster than the second durability level of operation.

5. The distributed data center system protocol as claimed in claim 1 wherein:

providing the plurality of database servers in the primary and backup data centers includes each of the plurality of database servers having failure detectors and the client having a failure detector with properties of strong completeness and eventual weak accuracy.

6. The distributed data center system protocol as claimed in claim 1 wherein:
   providing the client includes providing the client with disaster detectors with properties of strong completeness and eventual strong accuracy.

7. The distributed data center system protocol as claimed in claim 1 wherein:
   providing the plurality of database servers in the primary and backup data centers includes each of the plurality of database servers having disaster detectors with properties of strong completeness and strong accuracy.

8. The distributed data center system protocol as claimed in claim 1 wherein:
   providing the primary database server includes providing a local database therefor; and
   executing a transaction operation includes the primary database server sending the transaction operation to the local database.

9. The distributed data center system protocol as claimed in claim 1 including:
   communicating from the primary database server to the backup database servers by broadcast communication of a transaction unique identification, statements associated with the transaction operation, and control information from the primary database server to the backup database servers.

10. The distributed data center system protocol as claimed in claim 1 including:
    providing for only one primary data center and only one primary database server during a numbered epoch;
    establishing an epoch number by one of the plurality of database servers when the one of the plurality of database servers in the backup data center detects a failure of the primary data center;
    broadcasting a current epoch number from the one of the plurality of database servers to the other of the plurality of database servers to change the epoch number;
    determining the only one primary data center and the only one primary database server deterministically from the epoch number; and
    providing a transaction operation to the only one primary data center and the only one primary database server for the epoch number.

11. The distributed data center system protocol as claimed in claim 10 including:
    performing a certification test in each of the plurality of database servers after receiving the broadcasting of the epoch number.

12. A distributed data center system protocol comprising:
    providing a client having a failure detector and a plurality of data centers each including a plurality of database servers;
    selecting one of the plurality of data centers to be a primary data center with the other of the plurality of data centers to be a backup data center;
    selecting one of the plurality of database servers in the primary data center to be a primary database server with the other of the plurality of database servers therein to be a backup database server and the plurality of database servers in the backup data center to be backup database servers;
    providing communications from the client to the primary database server and the backup database servers;
    selecting one of the backup database servers as a new primary database server when one of the backup database servers detects a failure of the primary database server;
    providing further communications from the client to the new primary database server when the client suspects a failure of the primary database server; and
    checking whether the primary database server has already executed a transaction operation for a transactional job corresponding to the same transactional job before executing the transaction operation.

13. A distributed data center system protocol comprising:
    providing a client having a failure detector and a plurality of data centers each including a plurality of database servers;
    selecting one of the plurality of data centers to be a primary data center with the other of the plurality of data centers to be a backup data center;
    selecting one of the plurality of database servers in the primary data center to be a primary database server with the other of the plurality of database servers therein to be a backup database server and the plurality of database servers in the backup data center to be backup database servers;
    providing communications from the client to the primary database server and the backup database servers;
    selecting one of the backup database servers as a new primary database server when one of the backup database servers detects a failure of the primary database server;
    providing further communications from the client to the new primary database server when the client suspects a failure of the primary database server;
    providing for only one primary data center and only one primary database server during a numbered epoch;
    establishing an epoch number by one of the plurality of database servers when the one of the plurality of database servers in the backup data center detects a failure of the primary data center; and
    determining the only one primary data center and the only one primary database server deterministically from the epoch number.

14. A distributed data center system protocol comprising:
    providing a client having a failure detector and a plurality of data centers each including a plurality of database servers operatively interconnected;
    selecting one of the plurality of data centers to be a primary data center with the other of the plurality of data centers to be a backup data center;
    selecting one of the plurality of database servers in the primary data center to be a primary database server with the other of the plurality of database servers in the primary data center to be a backup database server and the plurality of database servers in the backup data center to be backup database servers;
    providing a transaction operation from the client to the primary database server and the backup database servers;
    providing error messages from the backup database servers to the client indicating that the backup database servers are not the primary database server;
    executing the transaction operation by the primary database server;
    selecting one of the backup database servers as a new primary database server when one of the backup database servers detects a failure of the primary database server;
    selecting one of the backup database servers as a new primary database server when one of the backup database servers suspects a failure of the primary database server;

providing the transaction operation from the client to the new primary database server when the client detects a failure or change of the primary database server;

executing the transaction operation by the new primary database server when the transaction operation is provided from the client to the new primary database server;

returning the result of the executed transaction operation from the new primary database server to the client; and checking whether the primary database server has already executed a transaction operation for a transactional job corresponding to the same transactional job before executing the transaction operation.

15. The distributed data center system protocol as claimed in claim 14 wherein:

providing the plurality of database servers includes providing local databases therefor;

executing the transaction operation includes the primary database server sending the transaction operation to the local database and waiting for a reply;

executing the transaction operation includes waiting for a reply from the local database to the primary database server and sending the reply to the client;

executing the transaction operation includes sending a commit request to the primary database server in response to the reply; and executing the transaction operation includes the primary database server broadcasting a transaction unique identification, SQL statements associated with the transaction operation, and control information to the backup data server in the primary data center, and the plurality of backup data servers in the backup data center.

16. The distributed data center system protocol as claimed in claim 14 including:

providing a second transaction operation from the client to the primary database server and the backup database servers; and executing the transaction operation and the second transaction operation in the same order both in the primary database server and the backup database server.

17. The distributed data center system protocol as claimed in claim 14 including:

providing first and second durability levels of operation wherein:

employing the first durability level in the primary database server executes the transaction operation faster than the second durability level of operation and employing the second durability level in the primary database server executes the transaction operation with the assurance that if the primary data center suffers a disaster, the plurality of backup databases in the backup data center will receive the transaction operation.

18. The distributed data center system protocol as claimed in claim 14 wherein:

providing the plurality of database servers in the primary and backup data centers includes each of the plurality of database servers having failure detectors and the client having a failure detector with the properties of:

strong completeness wherein, if the primary database server fails at time t, then there is a time t'>t after which the primary database server is permanently suspected of failure by the client and by the backup database server; and eventual weak accuracy wherein, if the primary database server that does not fail, then there is a time after which the primary database server is never suspected of failure by the client and by the backup database server.

19. The distributed data center system protocol as claimed in claim 14 wherein:

providing the client includes providing the client with disaster detectors with the properties of:

strong completeness wherein, if the primary data center fails at time t, then there is a time t'>t after which the primary data center is permanently suspected of failure by the client; and eventual strong accuracy wherein, if the primary data center that does not fail, then there is a time after which the primary data center is never suspected of failure by the client.

20. The distributed data center system protocol as claimed in claim 14 wherein:

providing the plurality of database servers in the primary and backup data centers includes each of the plurality of database servers having disaster detectors with the properties of:

strong completeness wherein, if the primary data center fails at time t, then there is a time t'>t after which the primary data center is permanently suspected of failure by the backup database servers; and strong accuracy wherein, if the primary data center that does not fail, then the primary data center is never suspected of failure by the backup database servers.

21. The distributed data center system protocol as claimed in claim 14 wherein:

providing the primary database server includes providing a local database therefor; and executing the transaction operation includes the primary database server sending the transaction operation to the local database.

22. The distributed data center system protocol as claimed in claim 14 including:

communicating from the primary database server to the backup database servers by broadcast communication of a transaction unique identification, statements associated with the transaction operation, and control information from the primary database server to the backup database servers.

23. The distributed data center system protocol as claimed in claim 14 including:

providing for only one primary data center and only one primary database server during a numbered epoch;

establishing an epoch number by one of the plurality of database servers when the one of the plurality of database servers in the backup data center detects a failure of the primary data center;

establishing an epoch number by one of the plurality of database servers when the one of the plurality of database servers in the primary or backup data centers detects a failure of the primary database server;

establishing an epoch number by one of the plurality of database servers when the one of the plurality of database servers in the primary or backup data center suspects a failure of the primary database server;

determining the only one primary data center and the only one primary database server deterministically from the epoch number; and providing the transaction operation to the only one primary data center and the only one primary database server for the epoch number.

24. The distributed data center system protocol as claimed in claim 14 including:
  providing for only one primary data center and only one primary database server during a numbered epoch;
  establishing an epoch number by one of the plurality of database servers when the one of the plurality of database servers in the backup data center detects a failure of the primary data center;
  establishing an epoch number by one of the plurality of database servers when the one of the plurality of database servers in the primary or backup data centers detects a failure of the primary database server;
  establishing an epoch number by one of the plurality of database servers when the one of the plurality of database servers in the primary or backup data center suspects a failure of the primary database server;
  broadcasting the a current epoch number from the one of the plurality of database servers to the other of the plurality of database servers to change the epoch number;
  determining the only one primary data center and the only one primary database server deterministically from the epoch number; and
  providing the transaction operation to the only one primary data center and the only one primary database server for the epoch number.

25. The distributed data center system protocol as claimed in claim 24 including:
  performing a certification test in each of the plurality of database servers after receiving the broadcasting of the epoch number wherein:
  executing the transaction operation includes broadcasting the transaction operation and the epoch number from the primary database server; and
  committing the completed transaction operation when the certification test determines the epoch number in the new primary database server is the same as the epoch number of the transaction operation.

26. A distributed data center system protocol comprising:
  providing a client and a plurality of data centers each including a plurality or database servers;
  specifying, by the client, conditions under which lost transactions are acceptable in order to increase performance;
  selecting one of the plurality of database servers to be a primary database server with the other of the plurality of database servers to be backup database servers;
  selecting one of the backup database servers as a new primary database server when one of the backup database servers detects a failure of the primary database server; and
  when the primary database server receives a message from the client to start a new transaction, chocking whether the primary database server has already executed another transaction corresponding to the now transaction to ensure that a job generates one committed transaction per database.

27. The distributed data center system protocol of claim 26 wherein only the primary database server gets requests from the client while the other of the plurality of database servers interact with the primary database server and not the client.

* * * * *